United States Patent [19]

Jäger et al.

[11] Patent Number: 4,892,509
[45] Date of Patent: Jan. 9, 1990

[54] BELT WITH RODS FOR A ROD BELT CONVEYOR

[75] Inventors: Andreas Jäger, Burgdorf; Friederich Röhrs, Celle, both of Fed. Rep. of Germany

[73] Assignee: Arnold Jäger, Fed. Rep. of Germany

[21] Appl. No.: 347,365

[22] Filed: May 4, 1989

[30] Foreign Application Priority Data

May 4, 1988 [DE] Fed. Rep. of Germany ....... 3815115
Feb. 6, 1989 [DE] Fed. Rep. of Germany ....... 3903475

[51] Int. Cl.⁴ .......................... F16G 1/00; B65G 15/30
[52] U.S. Cl. ..................................... 474/237; 198/844
[58] Field of Search ............... 474/237, 257, 239, 268, 474/167, 184; 156/137–144; 198/840, 844, 845, 847–849

[56] References Cited

U.S. PATENT DOCUMENTS 3,321,066 5/1967 Christianson .................. 198/844 X
3,889,803 6/1975 White ............................. 198/840 X
3,976,192 8/1976 Muller ............................ 198/844 X Primary Examiner—Thuy M. Bui
Attorney, Agent, or Firm—Becker & Becker, Inc.

[57] ABSTRACT

A belt with rods for a rod belt conveyor. Transversely extending rods are secured to the side bands. In order not to have to further prepare the rods and the bands, yet to provide a secure connection, a holder extends about the rod ends, with the ends of the holder being held by clamps that are forced into the non-prepared bands. The clamps or securing elements could at the same time also be formed as holders and could thereby form the aforementioned holder.

27 Claims, 2 Drawing Sheets

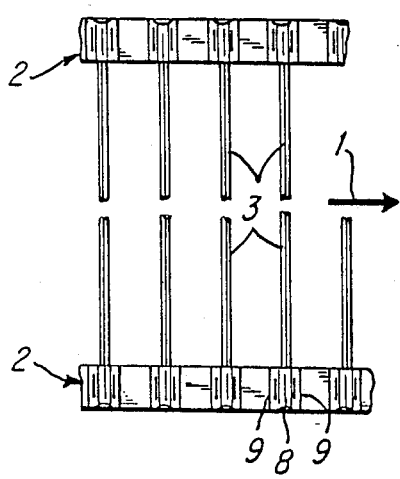
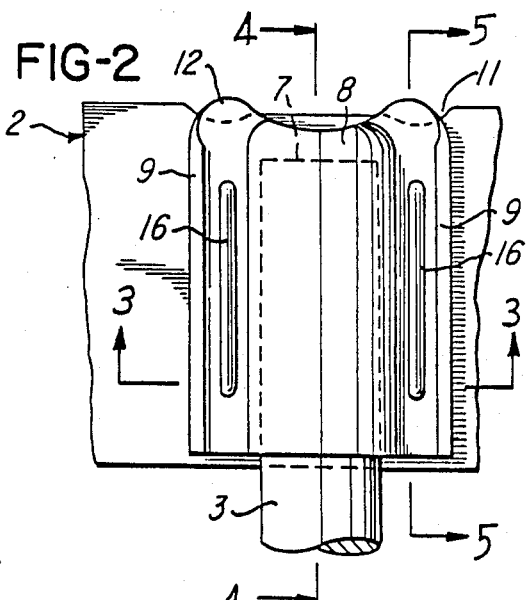
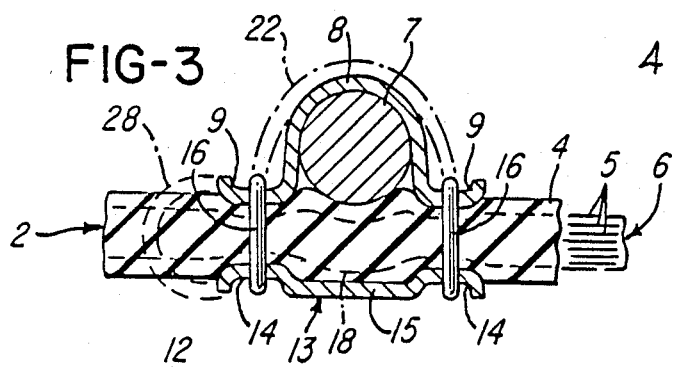
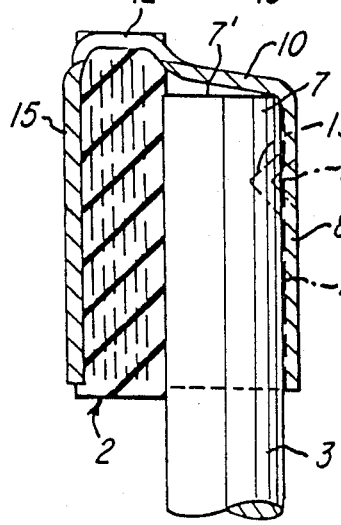
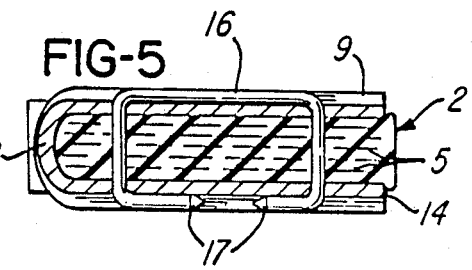

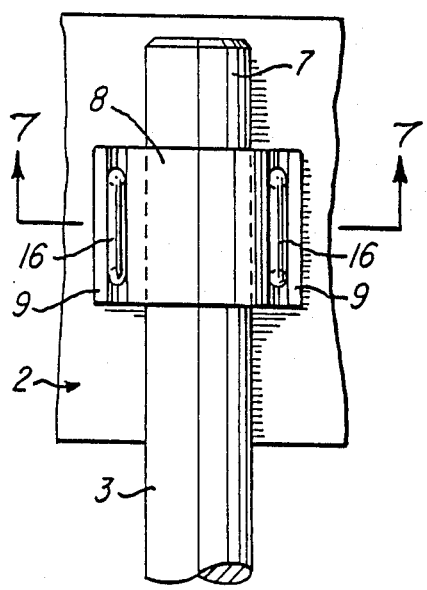
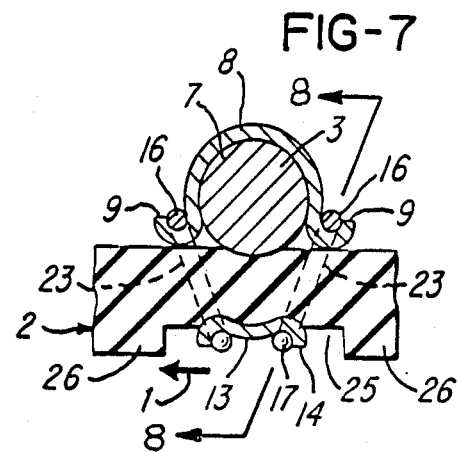
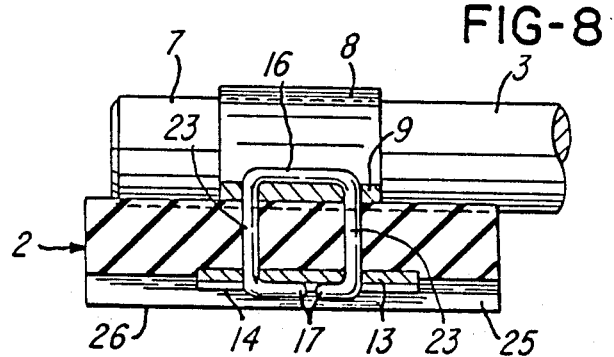
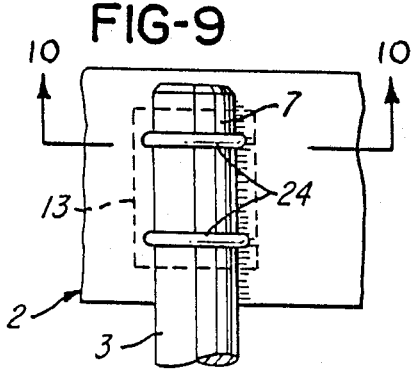
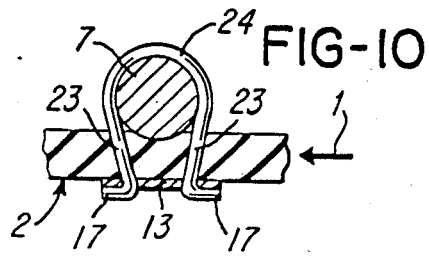

BELT WITH RODS FOR A ROD BELT CONVEYOR

BACKGROUND OF THE INVENTION

The present invention relates to a belt with rods for a rod belt conveyor, especially of an agricultural machine, in particular a harvesting machine. The belt has two or more circumferential, flexible, inextensible strips or bands that are interconnected by rods of steel or the like that are spaced from one another and extend transverse to the circumferential direction of the bands. The ends of the rods are secured to the bands by securing means that extend through the bands.

Rod belt conveyors are used with harvesting machines. In so doing, they serve not only for the actual transport of the harvested material, but also serve a sorting function, since the rods are mutually spaced from one another. Furthermore, the rod belts can be driven, for example, by gear wheels that engage between the rods, or via an inner toothing of the bands.

Since the connection between the rod ends and the bands must be secure, with heretofore known rods belts the rod ends are flattened off, are provided with holes, and are then secured by rivets or the like to the bands, which have previously been provided with holes for this purpose. However, these operations are expensive and complicated, and in addition lead to a weakening of the rods and especially of the bands.

It is therefore an object of the present invention to provide a secure connection of the rod ends and bands, which connection is considerably easier to realize and does not lead to an appreciable weakening of the parts that are to be interconnected.

BRIEF DESCRIPTION OF THE DRAWINGS

This object, and other objects and advantages of the present invention, will appear more clearly from the following specification in conjunction with the accompanying schematic drawings, in which:

FIG. 1 is a partial plan view of a belt with rods for a rod belt conveyor of an agricultural harvesting machine;

FIG. 2 is a plan view of the securement location of a rod end to a band of one exemplary embodiment of the inventive rod belt;

FIG. 3 is a cross-sectional view taken along the line III—III of FIG. 2;

FIG. 4 is a cross-sectional view taken along the line IV—IV of FIG. 2;

FIG. 5 is a cross-sectional view taken along the line V—V of FIG. 2;

FIG. 6 is a partial plan view of a modified exemplary embodiment of the inventive rod belt;

FIG. 7 is a cross-sectional view taken along the line VII—VII of FIG. 6;

FIG. 8 is a cross-sectional view taken along the line VIII—VIII of Fig. 7;

FIG. 9 is a partial plan view of a further modified exemplary embodiment of the inventive rod belt; and FIG. 10 is a cross-sectional view taken along the line X—X of FIG. 9.

SUMMARY OF THE INVENTION

The rod belt of the present invention is characterized primarily in that holder means, which extend essentially transverse to the rods, extend about the rod ends, with the ends of the holder means being secured to the bands by securing means that are forced through the bands, which are in a non-prepared state, i.e., they do not have any special holes or the like provided therein for the securing means.

Consequently, the rod ends, without having to be flattened off and provided with holes, are clamped by the securing means between the transversely extending holder means and the band, with the securing means preferably being tightened or drawn-in at the ends of the holder means to such an extent that the rod ends press slightly into the bands, and in particular preferably in such a way that the load-carrying member of the band, generally a rubberized woven fabric unit, also undergoes a slight wavelike deformation. As a result, the clamping and holding of the rod ends is improved still further. Added to the positive connection brought about by the holder means is also a positive connection resulting from the embedment in the band, as well as a resilient holding force, as a reaction force, based upon the deformation of the band. The holding or securing elements can be bracket or clamp-like pointed members that can readily be driven into or even through the band. In other words, it is not necessary to previously provide the band with holes; thus, to this extent the band remains "non-prepared".

Pursuant to a further proposal of the present invention, the holder means is one leg of an essentially U-shaped securing member, the crosspiece of which is disposed to the outside against the band, and the other leg of which is disposed on the opposite side of the band. This other leg similarly has the driven or forced-in securing means extend therethrough, and forms on the back side of the band a counter or cooperating plate that can serve to have the bent-over ends of the securing means rest thereagainst. It should be noted that the cross-piece or part that is disposed on the side faces of the bands, i.e. on the laterally outer sides of the bands, could also be formed as an eye so that it could be used as a connecting element between two band ends accompanied by the use of a rod that would be inserted through the eyes.

With the U-shaped inventive configuration, the aforementioned holder means extends transverse to the rod ends, while the legs extend at right angles thereto.

Further specific features of the present invention will be described in detail subsequently.

DESCRIPTION OF PREFERRED EMBODIMENTS

Referring now to the drawings in detail, the illustrated portion of the belt with rods is part of a rod belt conveyor that rotates in the direction of the arrow 1. The two edges of the belt with rods are provided with inextensible, flexible strips or bands 2 that are interconnected by transversely extending steel rods 3. On the one hand, the rods 3 serve a conveying function, and on the other hand, due to the spacing between the rods 3, a sorting effect is provided for the harvested material.

The bands 2 are made of rubber or rubber-like synthetic materials. The tops and bottoms of the bands 2 are provided with cover layers 4 of rubber, between which are disposed a plurality of rubberized plies 5, for example rubberized fabric plies, that are combined into a unit; this unit is designated by the reference numeral 6.

The securement of the rod ends 7 to the bands 2 as provided by the present invention is effected via a molded or profiled steel member, which will be described subsequently. As can be seen in the cross-sectional view of FIG. 3, the rod end 7 is held by a holder 8 that extends transverse to the rod end 7. The ends 9 of the holder 8 are angled off; that side of the ends 9 that faces the band 2 is rounded off, for example spherically.

While the holder 8 is formed in such a way that it also covers the free end face 7' of the rod end 7 via a portion 10 thereof, the two ends 9 of the holder 8 merge via the parts 12, which can be disposed in a recess 11 of the edge of the band 2, into a plate 13 that is disposed on the opposite side of the band. The plate 13 is provided with profiled portions or edges 14 that have rounded off portions in conformity with the ends 9. Disposed between the two edges 14, which project inwardly in a direction toward the band 2, is a recessed central portion 15.

As shown in the drawing, the oppositely disposed ends 9 and edges 14 are connected by highstrength steel clamps 16 that extend through them. The clamps 16, which are driven in from above, are provided with pointed ends 17 that are angled off toward one another and rest against the ends or edges 14 of the plate 13. All of the outwardly disposed portions of these clamps 16 are disposed in the recessed portions of the parts 9, 14.

As can be seen in particular from FIGS. 4 and 5, the previously described securement member (molded or profiled member) essentially has the following configuration: (a) with the holder part 8 it transversely covers the rod end 7; and (b) as can be seen from FIGS. 4 and 5, an approximately U-shaped configuration is provided is provided; at the top is a leg made up of the parts 8, 9, and at the bottom is a leg made up of the parts 14, 15; the two legs, which extend in the direction of the rod 3, merge with one another via the part 12, which on the outside rests against the side of the band or against the recess provided here.

This configuration, and the securement with the aid of the driven or forced-in clamps 16, results in a particularly good securement of the rod ends 7. Not only the end 9 but also the rod ends 7 press into the bands (see FIG. 3). FIG. 3 also shows that under the pressure of the ends 9 and the rod ends 7, the unit 6 also buckles (see the buckling 18); however, due to the presence of the recessed central portion 15, the stressed material has the possibility of spreading into the central portion 15. This deformation also helps to make the securement reliable.

It should be noted that the clamps 16 are pressed in without any material being removed; the rod ends 7 are not machined. Thus, it is merely necessary to cut the rods 3 to length; they can be used in this state for assembly. Furthermore, the bands 2 also require no preparation, such as having holes punched therein, etc.

As a result of the inventive securement, axial displacements cannot take place. However, for extreme cases, it is possible to provide the top of the rod ends 7 with a transverse notch 19 into which a bead 20 of the holder 8 can extend. This is shown by the dashed-line representation in Fig. 4.

As shown in FIG. 3 by the dashed-line representation 28, in order to be able to interconnect the endless bands 2 to form a closed ring, one holder end 9 can be connected with the edge part 14 to form an eye. It is then possible, in a known manner, to insert a transverse rod, as a connecting element for a flexible connection, through this eye as well as through an eye at the other end of the band.

In order, in addition, to preclude relative movements between the rod ends 7 and the holder 8, it is possible to provide herebetween a layer 21 that increases the cohesion. For this purpose, the rod end 7 can, in particular, be coated with an appropriate layer; however, a thin sleeve or cap can also be used for the rod.

As shown in FIGS. 2 and 5, the clamps 16 extend transverse to the band 2. However, as shown by the dashed-line representation 22 in FIG. 3, the clamps could also be placed transversely over the rod ends 7; the upper portions of the clamps would then reset upon the holders 8.

A particularly advantageous, straightforward securement of the rod ends 7 is illustrated in FIGS. 6-8. In this embodiment, the width of the holder 8 corresponds to only approximately ⅓ of the width of the band 2. In addition, of particular importance is the position of those portions 23 of the clamps 16 that are disposed within the bands 2. These portions 23 of the clamps 16 are symmetrically V-shaped relative to the rod ends 7 in such a way that the mutual spacing between the portions 23 of paired ones of the clamps 16 is greater at that side that faces the rod ends 7 than at that side that faces the plates 13. As a result, better and more permanent securements are provided, even for such rod belts that must be guided about small wheels or pulleys. As a result of the V-positioning of the portions 23 of the clamps 16, the deformation and stressing of the bands 2 at the deflection locations is to a large extent taken into account.

In order moreover to preclude axial shifting of the rod ends 7 due to the relatively short holders 8, the rod ends 7 are not only elastically pressed into the bands 2 by the holders 8, but rather the holders 8 are also embodied in such a way that rather than enclosing only about 180° of the upper surface of the rod ends, these holders enclosure about ⅔ of the surface of the rod ends, over which portion they are in contact with the rod. The thus improved contact surface of the holder 8 leads to an improved anchoring of the rod ends 7. This configuration of the holder 8 is shown in particular in FIG. 7.

A further simplified securement of the rod ends 7 is illustrated in FIGS. 9 and 10. In this embodiment, a special holder member is dispensed with. Its function is taken over by clamps 24 that at the top are U-shaped. Preferably two, and possibly also more, clamps 24 are always associated with one rod end 7. The portions of a clamp 24, here too designated by the reference numeral 23, that are disposed within the band body are similarly disposed in a V-shaped manner relative to one another. The ends 17 also extend through plates 13, and can, as shown in FIG. 10. be angled off either in the longitudinal direction of the band (arrow 1) or counter to this direction; however, as shown in FIG. 7, the end 17 could also extend parallel to the rod ends 7.

It should also be noted that, as shown in Fig. 7, the plate 13 is disposed against the inner side of the band 2 within a transversely extending space 25 between two teeth 26. The ends 17 of the clamp 16 of the embodiment illustrated in FIG. 7 could also be angled off in the longitudinal direction of the band. Furthermore, it is to be understood that here too the ends 9 could be resiliently pressed into the body on the band 2 by the clamps 16.

The present invention is, of course, in no way restricted to the specific disclosure of the specification and drawings, but also encompasses any modifications within the scope of the appended claims.

What we claim is: What we claim is:

1. In a belt with rods for a rod belt conveyor, especially of an agricultural machine, in particular a harvesting machine, with said belt having two or more circumferential, flexible, inextensible bands that are interconnected by rods of steel or the like that are spaced from one another and extend transverse to the circumferential direction of said bands, and with said rods having ends that are secured to said bands by securing means that extend through said bands, the improvement comprising:

bands that are in a non-prepared state, not having any special holes or the like provided therein for securing means;

holder means, with a respective holder means extending about each of said rod ends; and securing means in the form of clamps, with each of said holder means being held in place about its associated rod end via said clamps, which are adapted to be forced into said non-prepared bands.

2. A rod belt according to claim 1, in which said holder means extends transverse to said rod end.

3. A rod belt according to claim 1, in which said holder means has angled-off ends that rest upon said band, with said securing means extending through said ends of said holder means.

4. A rod belt according to claim 1, in which said holder means has angled-off ends that rest upon a first side of said band; and in which edge members are provided on an opposite side of said band, with said securing means extending through both said ends of said holder means as well as through said edge members.

5. A rod belt according to claim 4, in which said ends of said holder means and said edge members are rounded-off or are spherical in shape in a direction toward said band.

6. A rod belt according to claim 4, in which said band has ends at which said ends of said holder means and said edge members are interconnected to form eye means that are adapted to receive a connecting element to effect a flexible interconnection of said band ends to make said band circumferential.

7. A rod belt according to claim 4, which includes a central portion that interconnects said edge members, with said central portion being recessed relative to said edge members and being disposed from a plane of said band by a greater distance than are said edge members.

8. A rod belt according to claim 7, in which said rod end is adapted to be pressed into said band via said holder means.

9. A rod belt according to claim 8, in which said band includes load-carrying means, which are adapted to be buckled by said holder means; and in which that portion of said opposite side of said band that is opposite said rod end is adapted to be deformed in a direction toward said central portion.

10. A rod belt according to claim 4, in which said securing means are steel clamps having pointed ends that can be bent.

11. A rod belt according to claim 10, in which said clamps extend in the direction of said ends of said holder means and of oppositely disposed edge members.

12. A rod belt according to claim 10, in which said clamps extend over said holder means.

13. A rod belt according to claim 4, in which said ends of said holder means, and said oppositely disposed edge members, are adapted to be pressed into said band by said securing means.

14. A rod belt according to claim 13, in which said ends of said holder means and said edge members each have an approximately U-shaped cross-sectional configuration with free leg ends that face away from said band.

15. A rod belt according to claim 14, in which said U-shaped configuration is dimensioned to receive said securing means in a recessed manner.

16. A rod belt according to claim 1, which includes an essentially U-shaped securing member that has two legs and a crosspiece, with one of said legs being said holder means and resting upon a first side of said band, and the other of said legs resting against an opposite side of said band, and with said crosspiece facing a laterally outwardly disposed side face of said band, possibly being disposed in a recess of said band.

17. A rod belt according to claim 1, in which each of said rod ends has an end face, with said holder means being provided with a portion that faces said end face of said rod end.

18. A rod belt according to claim 1, in which said rod ends are provided with recessed means, and said holder means are provided with projecting means that engage in said recessed means.

19. A rod belt according to claim 1, which includes friction-enhancing means, for example a coating on said rod end or a sleeve-like intermediate layer, that is disposed between said rod end and said holder means, at least at locations that face said holder means.

20. A rod belt according to claim 1, in which said rod ends are essentially non-machined portions that correspond to a central portion of said rods.

21. A rod belt according to claim 1, in which portions of said securing means that are located within said band are disposed in a V-shaped manner such that the spacing between paired ones of said securing means is greater on a band side that faces said rod ends than on an opposite band side remote from said rod ends.

22. A rod belt according to claim 21, in which said embedded portions of said securing means are symmetrically disposed relative to a longitudinal central axis of said rod end.

23. A rod belt according to claim 1, in which a respective holder means is in contact with greater than 180°, and preferably with approximately ⅔ of the periphery of its associated rod end.

24. A rod belt according to claim 1, in which said band has a width, with said holder means being approximately centrally disposed on said band and extending over about ⅓ of said width thereof.

25. A rod belt according to claim 1, in which said securing means also form said holder means and extend over said rod ends.

26. A rod belt according to claim 25, in which each of said securing means has an essentially V-shaped configuration with two legs that are interconnected by a curved crosspiece that extends over said rod end, with said legs extending through said band and having respective ends that are bent back against a side of said band that is remote from said rod end, or that are bent back against a plate disposed on a side of said band that is remote from said rod end.

27. A rod belt according to claim 25, which includes, for each rod end, two spaced-apart securing means.

* * * * *